US011095667B2

(12) United States Patent
Somerville

(10) Patent No.: US 11,095,667 B2
(45) Date of Patent: Aug. 17, 2021

(54) SESSION-BASED RECORDING OF ASSOCIATION OF ACTIVITIES

(71) Applicant: Forcepoint LLC, Austin, TX (US)

(72) Inventor: Luke Somerville, Reading (GB)

(73) Assignee: Forcepoint LLC, Austin, TX (US)

(*) Notice: Subject to any disclaimer, the term of this patent is extended or adjusted under 35 U.S.C. 154(b) by 290 days.

(21) Appl. No.: 16/275,557

(22) Filed: Feb. 14, 2019

(65) Prior Publication Data
US 2020/0267166 A1    Aug. 20, 2020

(51) Int. Cl.
*H04L 29/06* (2006.01)
*H04L 29/08* (2006.01)

(52) U.S. Cl.
CPC .......... *H04L 63/1416* (2013.01); *H04L 67/02* (2013.01)

(58) Field of Classification Search
CPC .................... H04L 63/1416; H04L 67/02
See application file for complete search history.

(56) References Cited

U.S. PATENT DOCUMENTS

| | | | |
|---|---|---|---|
| 7,757,289 B2 | 7/2010 | Gruzman | |
| 7,769,994 B2 | 8/2010 | Peles | |
| 8,141,154 B2 | 3/2012 | Gruzman | |
| 8,201,245 B2 | 6/2012 | Dewey | |
| 8,224,308 B1 * | 7/2012 | Gavrylyako | H04L 67/02 455/418 |
| 8,326,826 B1 * | 12/2012 | Upstill | G06F 16/954 707/723 |
| 8,413,239 B2 | 4/2013 | Sutton | |
| 8,499,283 B2 | 7/2013 | Mony | |
| 8,789,178 B2 | 7/2014 | Kejriwal | |
| 8,838,992 B1 | 9/2014 | Zhu | |
| 8,869,259 B1 | 10/2014 | Udupa | |
| 8,881,278 B2 | 11/2014 | Kaplan | |
| 8,997,233 B2 | 3/2015 | Green | |
| 9,032,516 B2 | 5/2015 | Kim | |
| 9,043,917 B2 | 5/2015 | Zhang | |
| 9,160,718 B2 | 10/2015 | Martini | |
| 9,256,733 B2 | 2/2016 | Rajabi | |
| 9,398,032 B1 | 7/2016 | Wan | |
| 9,411,902 B2 | 8/2016 | Rajabi | |
| 9,444,831 B1 | 9/2016 | Lee | |
| 9,455,997 B2 | 9/2016 | Shulman | |
| 9,544,318 B2 | 1/2017 | Tatourian | |
| 9,836,612 B2 | 12/2017 | Li | |
| 9,858,414 B2 | 1/2018 | Green | |
| 2010/0280860 A1 * | 11/2010 | Iskold | G06Q 50/01 705/319 |
| 2011/0030060 A1 | 2/2011 | Kejriwal | |
| 2013/0282714 A1 * | 10/2013 | Lathrom | G06F 16/955 707/736 |
| 2017/0324555 A1 * | 11/2017 | Wu | H04L 63/1416 |
| 2020/0267166 A1 * | 8/2020 | Somerville | H04L 63/1416 |

OTHER PUBLICATIONS

HTTP Trace, https://chrome.google.com/webstore/detail/http-trace/idladlllljmbcnfninpljlkaoklggknp.

* cited by examiner

*Primary Examiner* — Arvin Eskandarnia
(74) *Attorney, Agent, or Firm* — Jackson Walker L.L.P.

(57) ABSTRACT

A method, system, and computer-usable medium are disclosed for, responsive to receipt at a security device of a webpage request from a client to a server, obtaining a unique user identifier corresponding to a tab of a web browser issuing the webpage request and associating the unique user identifier with network events associated with the tab and the webpage request.

15 Claims, 3 Drawing Sheets

SESSION-BASED RECORDING OF ASSOCIATION OF ACTIVITIES

FIELD OF DISCLOSURE

The present invention relates in general to the field of computers and similar technologies, and in particular to software utilized in this field. Still more particularly, it relates to a method, system, and computer-usable medium for session-based recording of an association of activities in connection with a web page request.

BACKGROUND

While network communication among networked computers, including the use of the Internet, has many advantages, one downside to network communication is that it may render networked computers susceptible to malicious attacks from viruses or other intrusions. One attack vector for malicious attacks, viruses, and intrusions is the World Wide Web, in which a website accessed by a user at an endpoint device may include malicious code.

As web content increases in complexity, resources are often loaded from multiple remote hosts in order to render a web page and its supporting elements (e.g., tracking scripts) correctly. Such remote hosts may include subdomains associated with the domain of a uniform resource locator (URL) for the web page, but may also include requests from other domains in order to render the web page. Such behavior often creates difficulties for web filtering and monitoring proxies, as such devices may be aware of the individual requests but not of their collective association as part of a single user-generated request or as follow-on requests to deliver active content to a page already rendered (i.e., dynamically generated requests generated by scripts as part of an active browsing session).

Accordingly, using traditional approaches, proxy logs alone may not describe the activity generated by a single browser tab, instead treating the various requests as a series of discrete events rather than the closely-associated sub-events of a single user interaction. This lack of a "stateful" understanding of browsing sessions limits the ability of traditional security devices to detect abnormal follow-on requests caused by execution of malicious code.

SUMMARY

In accordance with the teachings of the present disclosure, certain disadvantages and problems associated with existing approaches to network and data security have been reduced or eliminated.

In accordance with embodiments of the present disclosure, a computer-implementable method for managing network communication may include, responsive to receipt at a security device of a webpage request from a client to a server, obtaining a unique user identifier corresponding to a tab of a web browser issuing the webpage request and associating the unique user identifier with network events associated with the tab and the webpage request.

In accordance with these and other embodiments of the present disclosure, a system may include a processor, a data bus coupled to the processor, and a non-transitory, computer-readable storage medium embodying computer program code, the non-transitory, computer-readable storage medium being coupled to the data bus, the computer program code interacting with a plurality of computer operations and comprising instructions executable by the processor. The instructions may be configured for, responsive to receipt at a security device of a webpage request from a client to a server, obtaining a unique user identifier corresponding to a tab of a web browser issuing the webpage request and associating the unique user identifier with network events associated with the tab and the webpage request.

In accordance with these and other embodiments of the present disclosure, a non-transitory, computer-readable storage medium may embody computer program code, the computer program code comprising computer executable instructions configured for, responsive to receipt at a security device of a webpage request from a client to a server, obtaining a unique user identifier corresponding to a tab of a web browser issuing the webpage request and associating the unique user identifier with network events associated with the tab and the webpage request.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
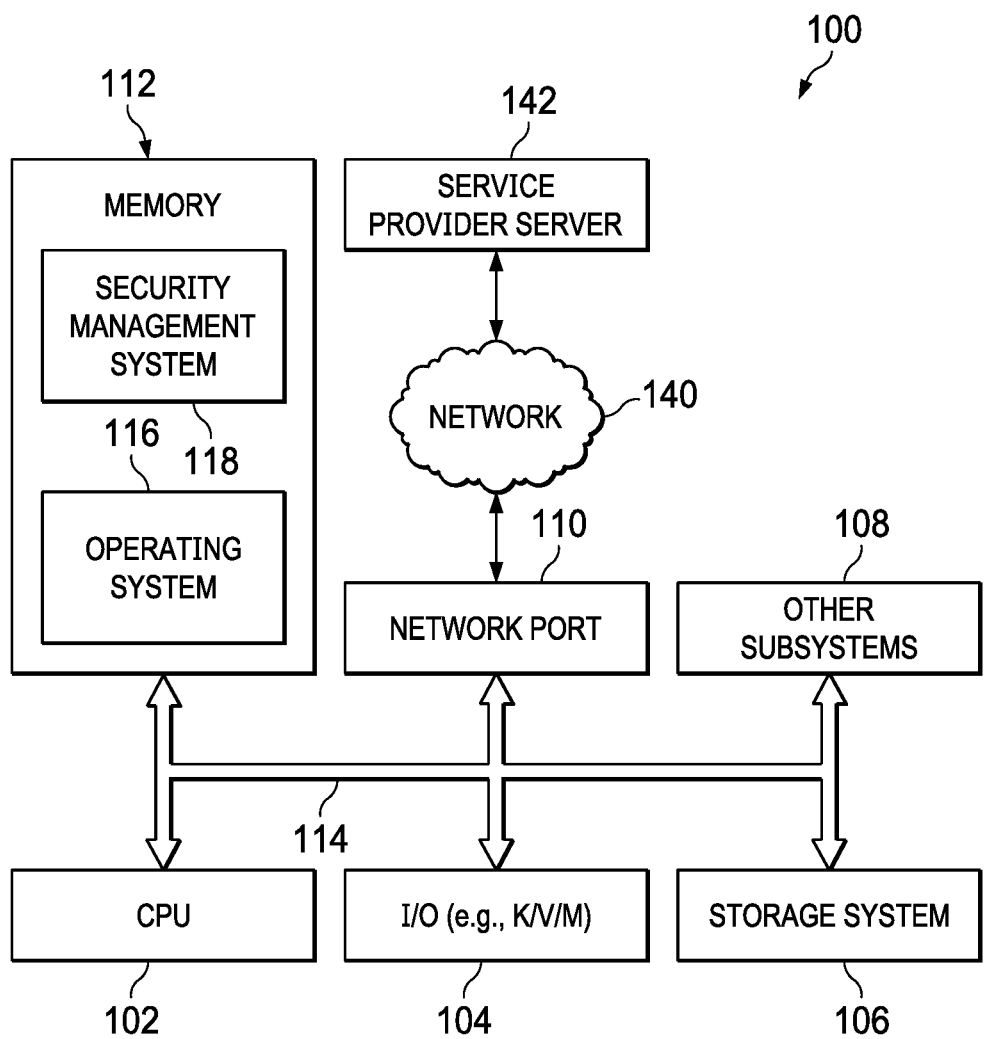
FIG. 1 illustrates an example information handling system in which the methods and systems disclosed herein may be implemented, in accordance with embodiments of the present disclosure.

FIG. 1 illustrates an example information handling system 100 in which the methods and systems disclosed herein may be implemented, in accordance with embodiments of the present disclosure. Information handling system 100 may include a processor (e.g., central processor unit or "CPU") 102, input/output (I/O) devices 104 (e.g., a display, a keyboard, a mouse, and/or associated controllers), a storage system 106, and various other subsystems 108. In various embodiments, information handling system 100 may also include network port 110 operable to couple to a network 140, which may likewise be accessible by a service provider server 142. Information handling system 100 may also include system memory 112, which may be coupled to the foregoing via one or more buses 114. System memory 112 may store operating system (OS) 116 and in various embodiments may also include a security management system 118. In some embodiments, information handling system 100 may be able to download security management system 118 from service provider server 142. In other embodiments, security management system 118 may be provided as a service from the service provider server 142.

In various embodiments, security management system 118 may (as described in greater detail below) be configured to perform logging of web requests (e.g., Hypertext Transfer Protocol or HTTP requests) on a per-user-session (e.g., per browser tab) basis, which may enable a more holistic view of a given web page as compared to existing approaches, and may also allow for automatic identification and association of follow-on traffic generated by scripts and active content with the original web-page request. In some embodiments, security management system 118 and the functionality thereof may improve processor efficiency, and thus the efficiency of information handling system 100, by performing network security operations with greater efficiency and with decreased processing resources as compared to existing approaches for similar network security operations. In these and other embodiments, security management system 118 and the functionality thereof may improve effectiveness in ensuring network security, and thus the effectiveness of information handling system 100, by performing network security operations with greater effectiveness as compared to existing approaches for similar network security operations. As will be appreciated, once information handling system 100 is configured to perform the functionality of security management system 118, information handling system 100 becomes a specialized computing device specifically configured to perform the functionality of security management system 118, and is not a general purpose computing device. Moreover, the implementation of functionality of security management system 118 on information handling system 100 improves the functionality of information handling system 100 and provides a useful and concrete result of improving network security and performing network security operations with greater efficiency and with decreased processing resources by enabling per-user-session logging of web requests as described herein.

Figure 2:
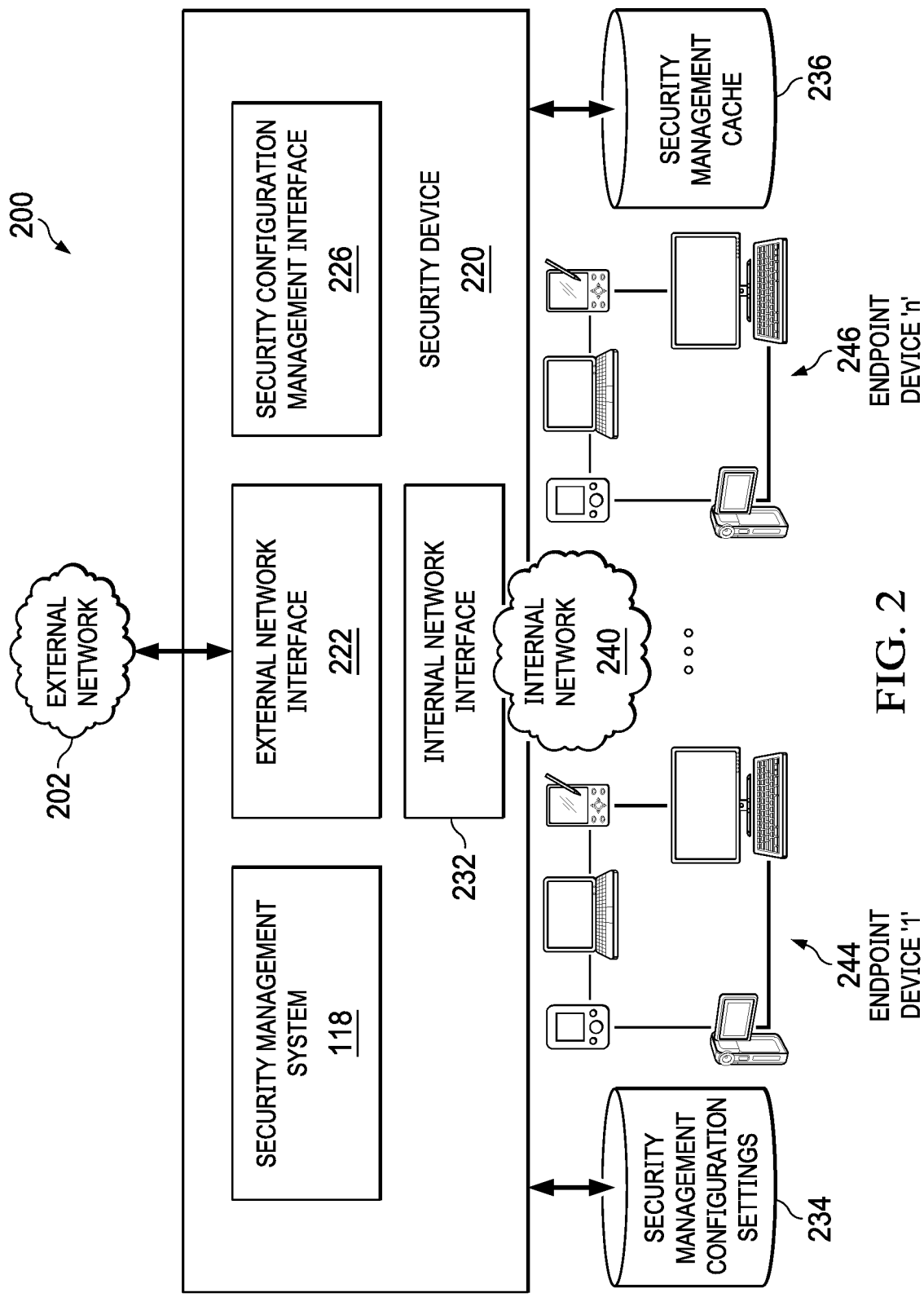
FIG. 2 illustrates a block diagram of a system for performing session-based recording of an association of activities in connection with a web page request, in accordance with embodiments of the present disclosure.

FIG. 2 illustrates a block diagram of a system 200 for performing session-based recording of an association of activities in connection with a web page request, in accordance with embodiments of the present disclosure. In some embodiments, a security device 220 may include an external network interface 222, a security configuration management interface 226, an internal network interface 232 interfaced to external network 202, and a security management system 118. Security device 220 may be implemented using any suitable information handling system 100, including without limitation a web proxy, a gateway, a firewall, an intrusion prevention system, an intrusion detection system, or any other suitable security device capable of implementing security management system 118. In some embodiments, security device 220 may be implemented as an individual security device 220, a virtual context security device 220, or a security device 220 cluster.

Security device 220 may also include in some embodiments a repository of security management configuration settings 234 and a security management cache 236. In certain embodiments, security configuration management interface 226 may be implemented to receive instructions relating to network security policy decisions from security management system 118.

Skilled practitioners of the art will be familiar with network communication involving communicating Internet Protocol (IP) datagrams, or packets, to a target group of recipient network addresses in real-time or near real-time. In some embodiments, the target group recipient network addresses may be respectively associated with a corresponding endpoint device '1' 244 through 'n' 246. As used herein, an endpoint device refers to an information processing system such as a personal computer, a laptop computer, a tablet computer, a smart phone, a mobile telephone, a digital camera, a video camera, or other device capable of storing, processing and communicating data via a network, such as an internal network 240 interfaced to internal network interface 232. In various embodiments, the communication of the data may take place in real-time or near-real-time.

Embodiments of the invention may reflect an appreciation that network communication may represent an efficient means for communicating useful information. However, those of skill in the art will likewise appreciate that it may be desirable to secure such network communication to prevent malicious attacks on network components. Many existing solutions for providing security in a network environment have disadvantages, as described in the Background section of this application. However, security management system 118 as disclosed herein may overcome these disadvantages by enabling session-based recording of an association of activities in connection with a web page request, as described herein.

Figure 3:
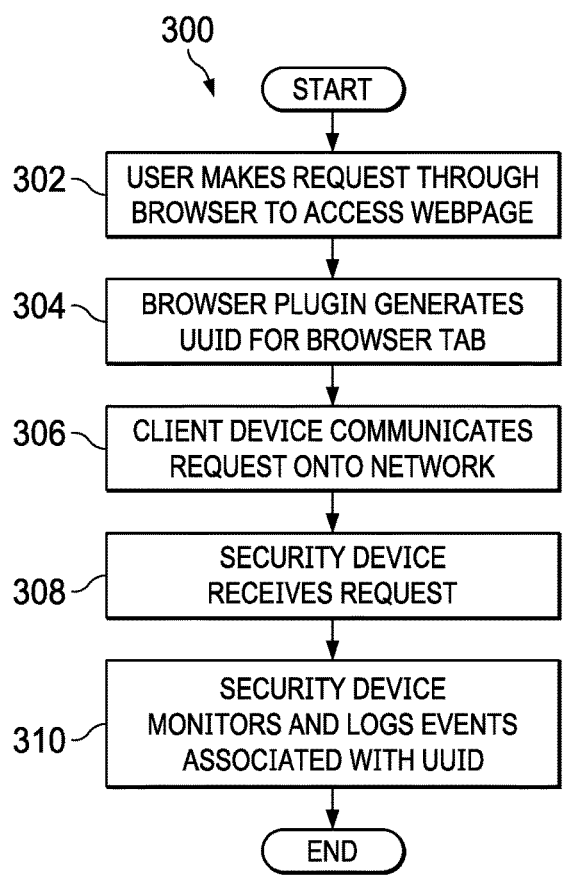
FIG. 3 illustrates a flow chart of an example method for performing session-based recording of an association of activities in connection with a web page request, in accordance with embodiments of the present disclosure.

FIG. 3 illustrates a flow chart of an example method 300 for performing session-based recording of an association of activities in connection with a web page request, in accordance with embodiments of the present disclosure. According to some embodiments, method 300 may begin at step 302. As noted above, teachings of the present disclosure may be implemented in a variety of configurations of information handling system 100. As such, the preferred initialization point for method 300 and the order of the steps comprising method 300 may depend on the implementation chosen.

At step 302, upon opening a new browser tab of a web browser from a client device (e.g., an endpoint device 244, 246), a user may make a request through the browser to access a given webpage (e.g., by typing a URL, selecting an item from the user's list of favorite webpages, or having the browser make a request to a default web page). At step 304, a plugin of the web browser may generate a unique user identifier (UUID) for the browser tab in which the webpage access request is made, and insert the UUID as an HTTP header into the request. At step 306, the client device may communicate the request to a network. At step 308, a security device (e.g., security device 220, a proxy, etc.) may receive the request from the client device. At step 310, the security device may monitor and log events associated with the UUID for generating a webpage responsive to the request, thus providing an association with follow-on events generated dynamically within the webpage and/or ongoing interactive browsing events generated by the user. Such log may be stored in security management cache 236 or other appropriate computer-readable medium.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using CPU 102, security management system 118 executing thereon, and/or any other system operable to implement method 300. In certain embodiments, method 300 may be implemented partially or fully in software and/or firmware embodied in computer-readable media.

Figure 4:
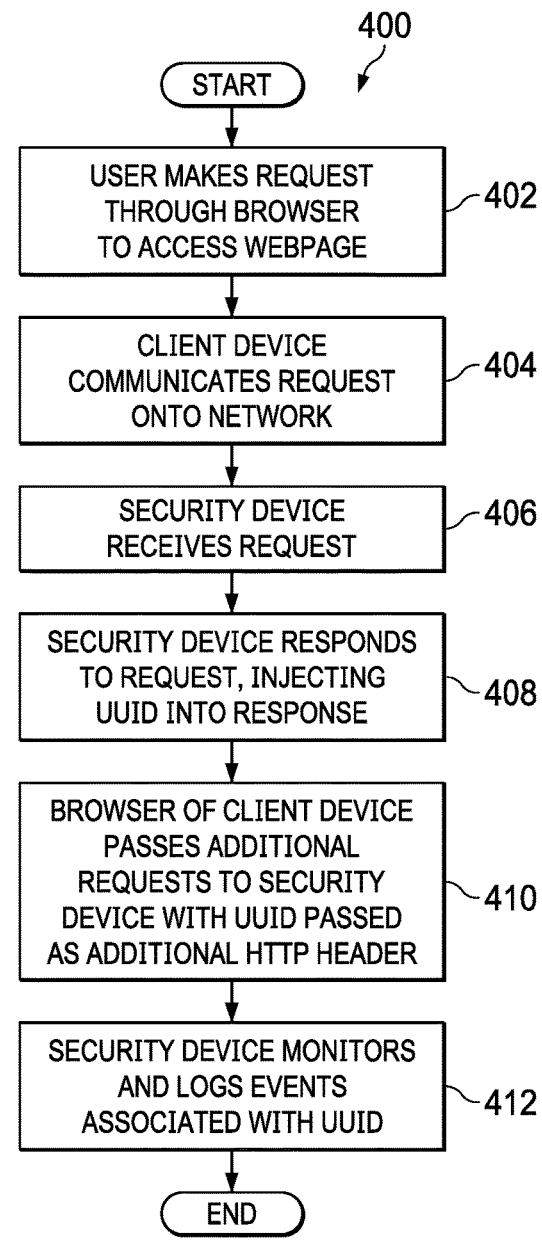
FIG. 4 illustrates a flow chart of another example method for performing session-based recording of an association of activities in connection with a web page request, in accordance with embodiments of the present disclosure.

FIG. 4 illustrates a flow chart of another example method 400 for performing session-based recording of an association of activities in connection with a web page request, in accordance with embodiments of the present disclosure. According to some embodiments, method 400 may begin at step 402. As noted above, teachings of the present disclosure may be implemented in a variety of configurations of information handling system 100. As such, the preferred initialization point for method 400 and the order of the steps comprising method 400 may depend on the implementation chosen.

At step 402, upon opening a new browser tab of a web browser from a client device (e.g., an endpoint device 244, 246), a user may make a request through the browser to access a given webpage (e.g., by typing a URL, selecting an item from the user's list of favorite webpages, or having the browser make a request to a default web page). At step 404, the client device may communicate the request to a network. At step 406, a security device (e.g., security device 220, a proxy, etc.) may receive the request from the client device. At step 408, the security device may respond to the request, including injecting a UUID into code for the file sent as the response to the request. In some embodiments, such injection of a UUID by the security device may include injecting the UUID as part of an HTTP header of a response, in a manner identical or similar to that disclosed in U.S. patent application Ser. No. 15/956,357, entitled "Distributed Client Protection" and filed Apr. 18, 2018, which is incorporated by reference herein in its entirety. The security device may also further ensure that additional responses sent to the client device include the injected UUID. At step 410, after receiving the UUID associated with the session from the security device, the browser of the client device may pass additional requests to the security device with the UUID passed as additional HTTP header to the security device. Accordingly, at step 412, the security device may monitor and log events associated with the UUID for generating a webpage responsive to the original request, thus providing an association with follow-on events generated dynamically within the webpage and/or ongoing interactive browsing events generated by the user. Such log may be stored in security management cache 236 or other appropriate computer-readable medium.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using CPU 102, security management system 118 executing thereon, and/or any other system operable to implement method 400. In certain embodiments, method 400 may be implemented partially or fully in software and/or firmware embodied in computer-readable media.

In the embodiments described above, additional HTTP headers including UUID information passed from browser to security device may, in some of such embodiments, be stripped by the security device to prevent such headers from being relayed to the server serving the web content or other parts of the Internet. In such embodiments, the security device may reinstate the headers for responses communicated from the security device to the browser.

Although the foregoing contemplates that security management system 118 resides in security device 220, in some embodiments, security management system 118 may be implemented by a device external to security device 220, including without limitation a device within external network 202.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A computer-implemented method comprising:
   responsive to receipt at a security device of a webpage request from a client to a server:
      obtaining a unique identifier corresponding to a tab of a web browser issuing the webpage request by extracting the unique identifier from a header of the webpage request, wherein the unique identifier is generated by a plugin of the web browser; and
      associating the unique identifier with network events associated with the tab and the webpage request.

2. The method of claim 1, further comprising maintaining a log of the network events in a manner that associates the network events with the tab and the webpage request.

3. A system comprising:
   a processor; and
   a non-transitory, computer-readable storage medium embodying instructions executable by the processor and configured for, responsive to receipt at a security device of a webpage request from a client to a server:
      obtaining a unique identifier corresponding to a tab of a web browser issuing the webpage request by extracting the unique identifier from a header of the webpage request, wherein the unique identifier is generated by a plugin of the web browser; and
      associating the unique identifier with network events associated with the tab and the webpage request.

4. The system of claim 3, the instructions further configured for maintaining a log of the network events in a manner that associates the network events with the tab and the webpage request.

5. A non-transitory, computer-readable storage medium embodying computer program code, the computer program code comprising computer executable instructions configured for, responsive to receipt at a security device of a webpage request from a client to a server:
   obtaining a unique identifier corresponding to a tab of a web browser issuing the webpage request by extracting the unique identifier from a header of the webpage request, wherein the unique identifier is generated by a plugin of the web browser; and
   associating the unique identifier with network events associated with the tab and the webpage request.

6. The storage medium of claim 5, the instructions further configured for maintaining a log of the network events in a manner that associates the network events with the tab and the webpage request.

7. A computer-implemented method comprising:
   responsive to receipt at a security device of a webpage request from a client to a server:
      generating a unique identifier corresponding to a tab of a web browser issuing the webpage request;
      associating the unique identifier with network events associated with the tab and the webpage request; and
      injecting, by the security device, the unique identifier into a response to the webpage request.

8. The method of claim 7, further comprising passing additional responses associated with the webpage request to the web browser with the unique identifier passed as a header of the webpage request.

9. The method of claim 7, further comprising maintaining a log of the network events in a manner that associates the network events with the tab and the webpage request.

10. A system comprising:
    a processor; and
    a non-transitory, computer-readable storage medium embodying instructions executable by the processor and configured for, responsive to receipt at a security device of a webpage request from a client to a server:
       generating a unique identifier corresponding to a tab of a web browser issuing the webpage request;
       associating the unique identifier with network events associated with the tab and the webpage request; and
       injecting, by the security device, the unique identifier into a response to the webpage request.

11. The system of claim 10, the instructions further configured for passing additional responses associated with the webpage request to the web browser with the unique identifier passed as a header of the webpage request.

12. The system of claim 10, the instructions further configured for maintaining a log of the network events in a manner that associates the network events with the tab and the webpage request.

13. A non-transitory, computer-readable storage medium embodying computer program code, the computer program code comprising computer executable instructions configured for, responsive to receipt at a security device of a webpage request from a client to a server:

generating a unique identifier corresponding to a tab of a web browser issuing the webpage request;

associating the unique identifier with network events associated with the tab and the webpage request; and injecting, by the security device, the unique identifier into a response to the webpage request.

14. The storage medium of claim 13, the instructions further configured for passing additional responses associated with the webpage request to the web browser with the unique identifier passed as a header of the webpage request.

15. The storage medium of claim 13, the instructions further configured for maintaining a log of the network events in a manner that associates the network events with the tab and the webpage request.

* * * * *